Jan. 16, 1934.    B. A. PROCTOR    1,944,036
FILM HANDLING APPARATUS
Original Filed Jan. 16, 1929    8 Sheets-Sheet 1
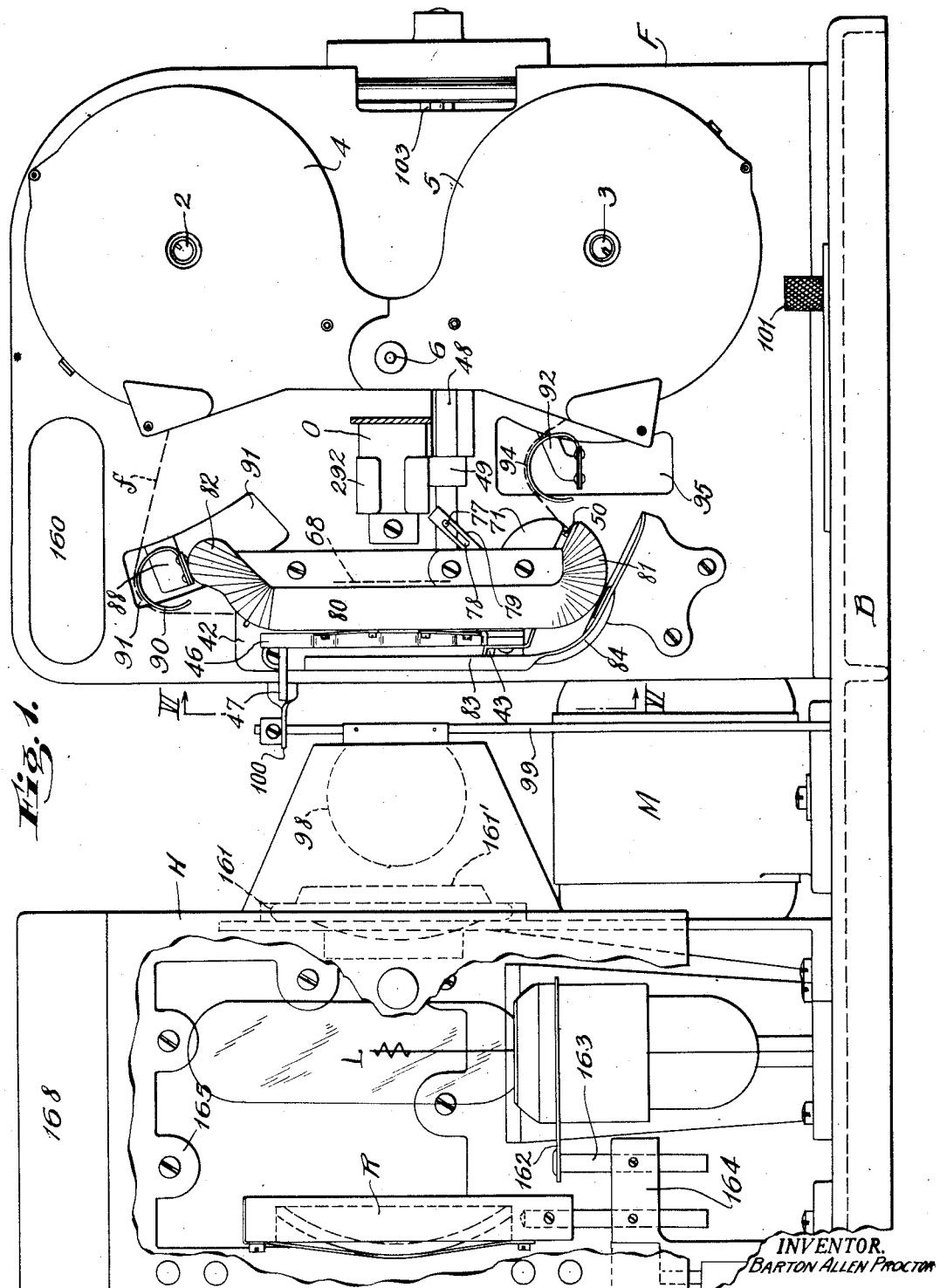
INVENTOR.
BARTON ALLEN PROCTOR
BY
Waldo G. Morse
ATTORNEYS.

Jan. 16, 1934.　　　B. A. PROCTOR　　　1,944,036
FILM HANDLING APPARATUS
Original Filed Jan. 16, 1929　　8 Sheets-Sheet 2
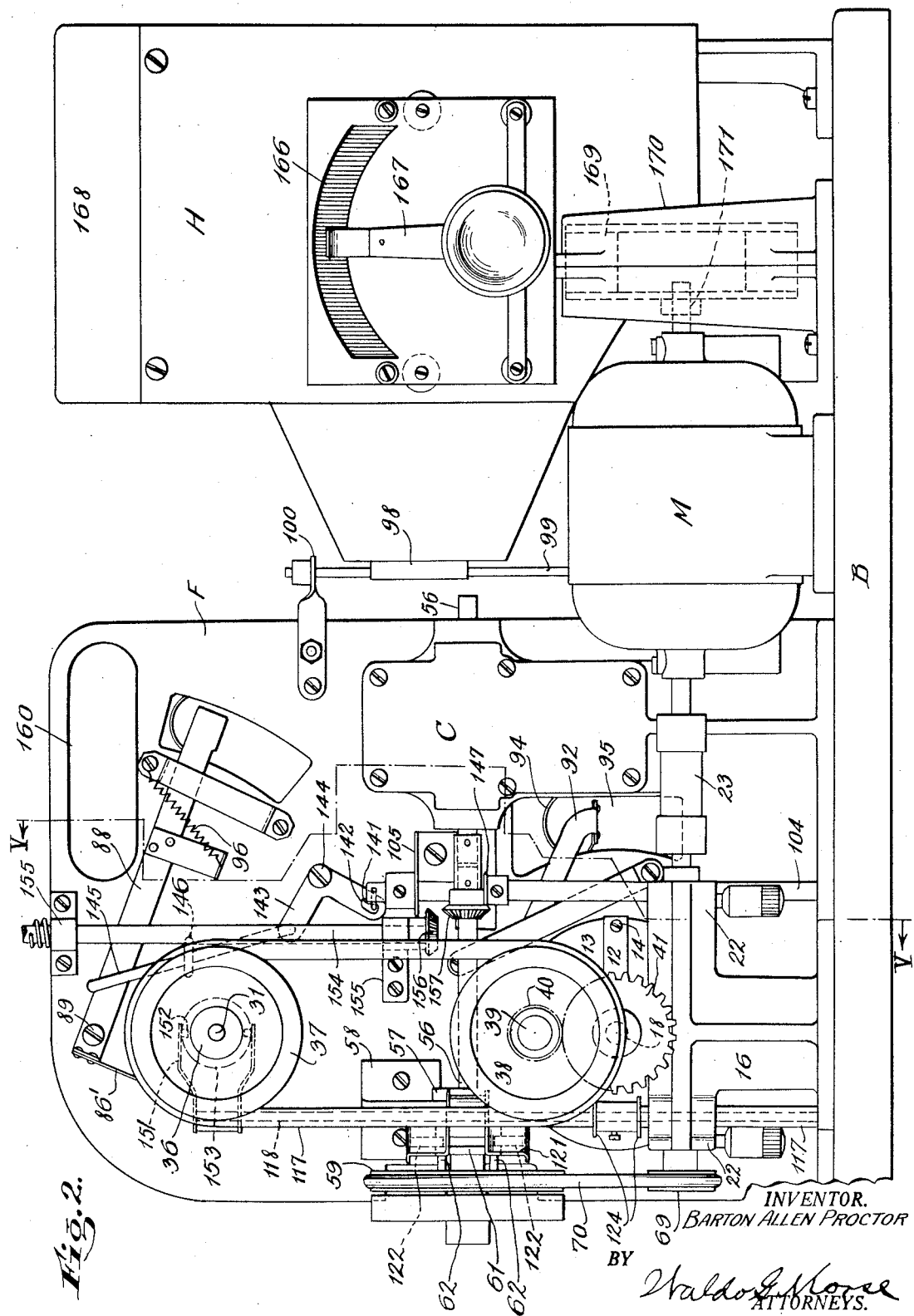
INVENTOR.
BARTON ALLEN PROCTOR
BY
Waldo J. Moore
ATTORNEYS.

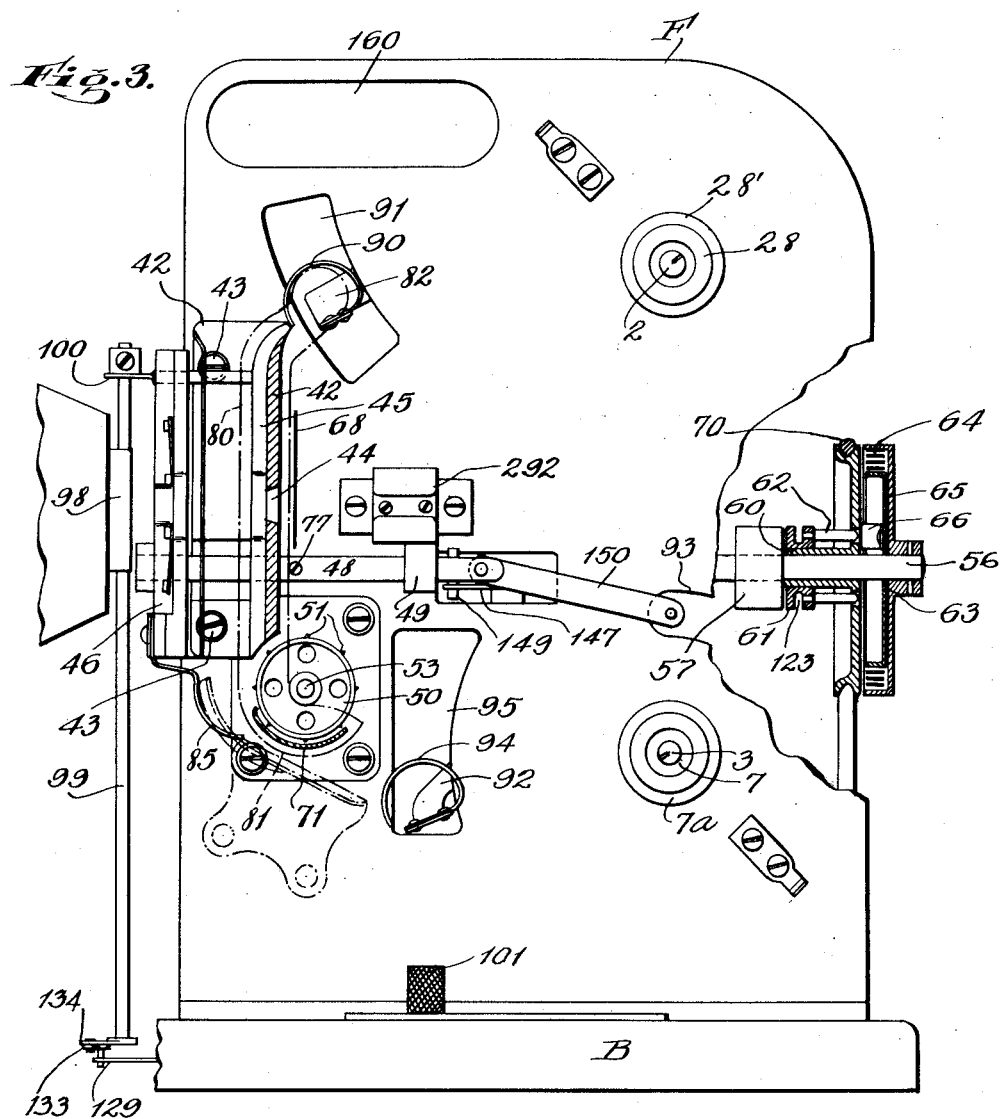

Jan. 16, 1934.  B. A. PROCTOR  1,944,036
FILM HANDLING APPARATUS
Original Filed Jan. 16, 1929  8 Sheets-Sheet 4
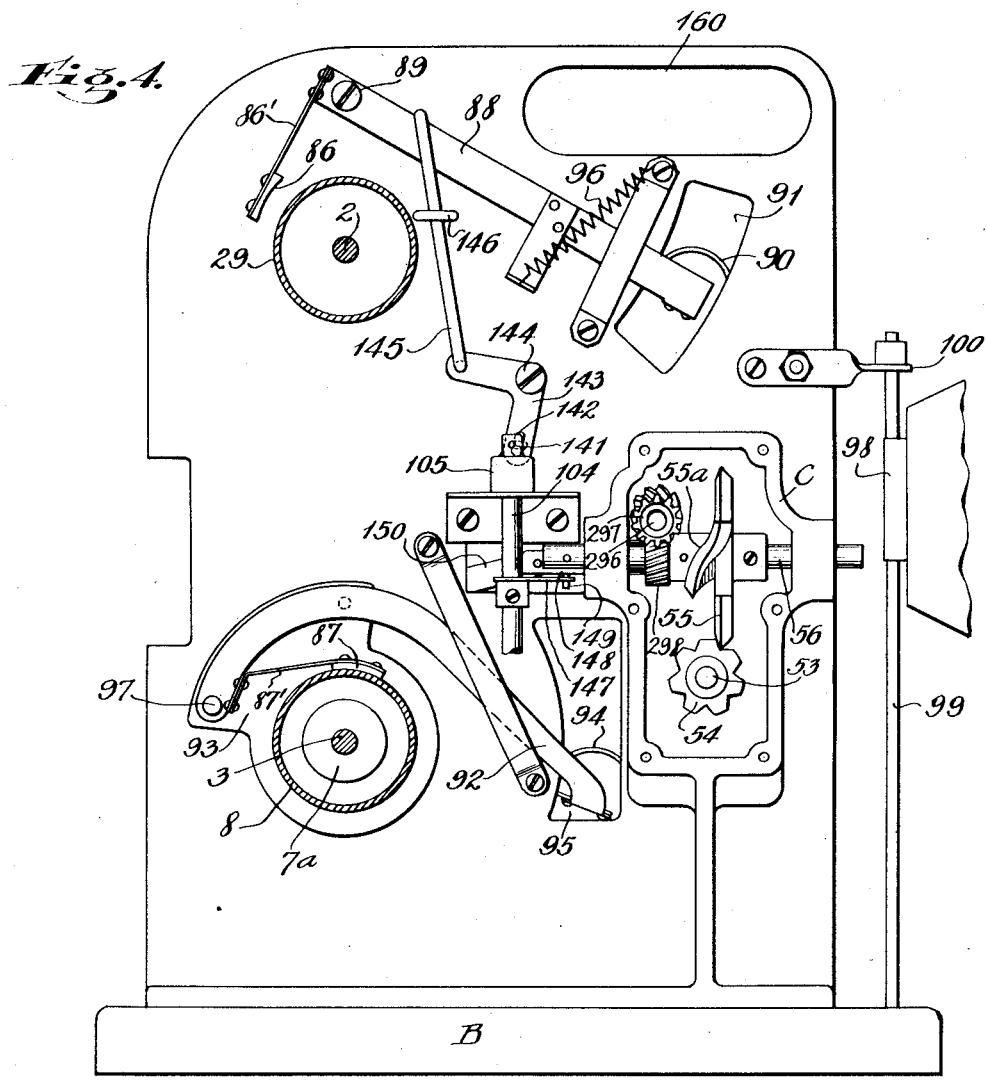
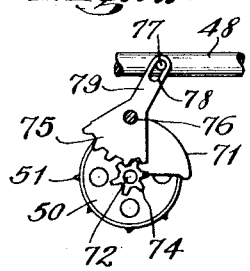
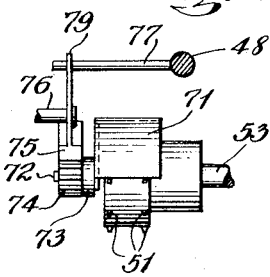
INVENTOR.
BARTON ALLEN PROCTOR
BY Waldo G. Morse
ATTORNEYS.

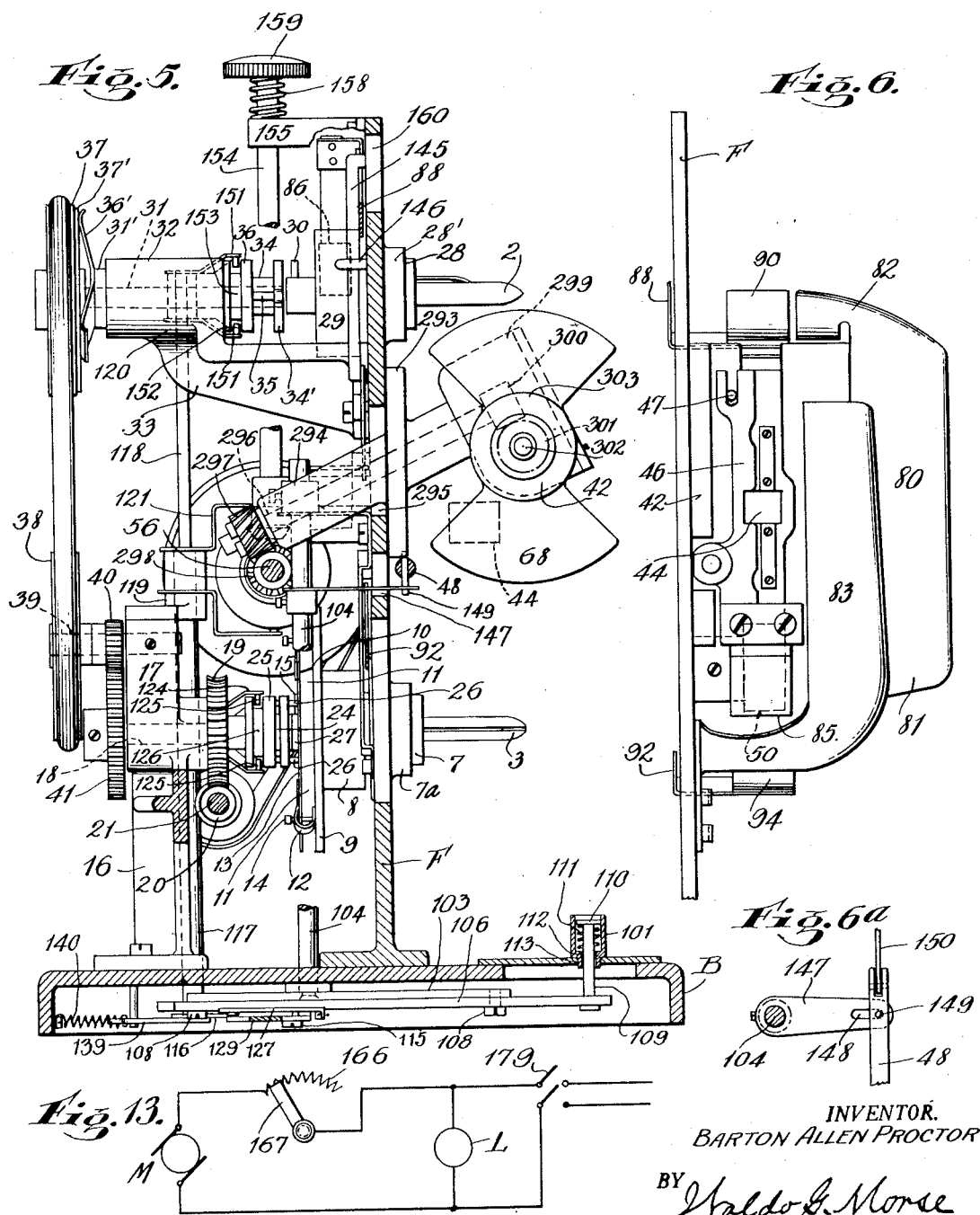

Jan. 16, 1934.                B. A. PROCTOR                1,944,036
                          FILM HANDLING APPARATUS
              Original Filed Jan. 16, 1929      8 Sheets-Sheet 6
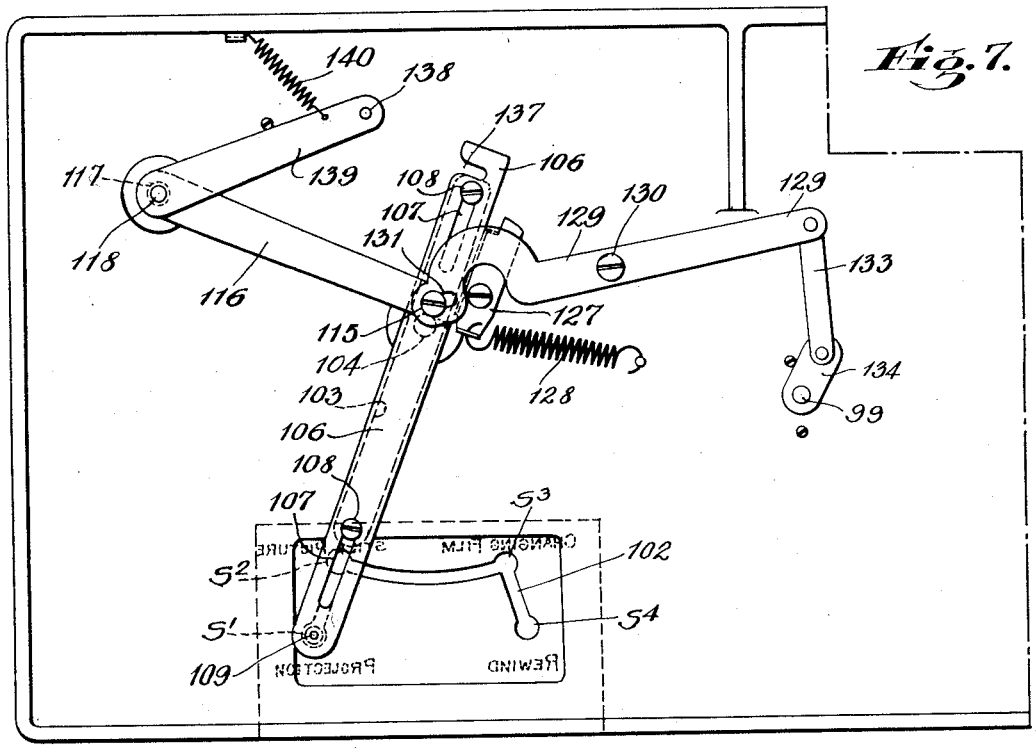
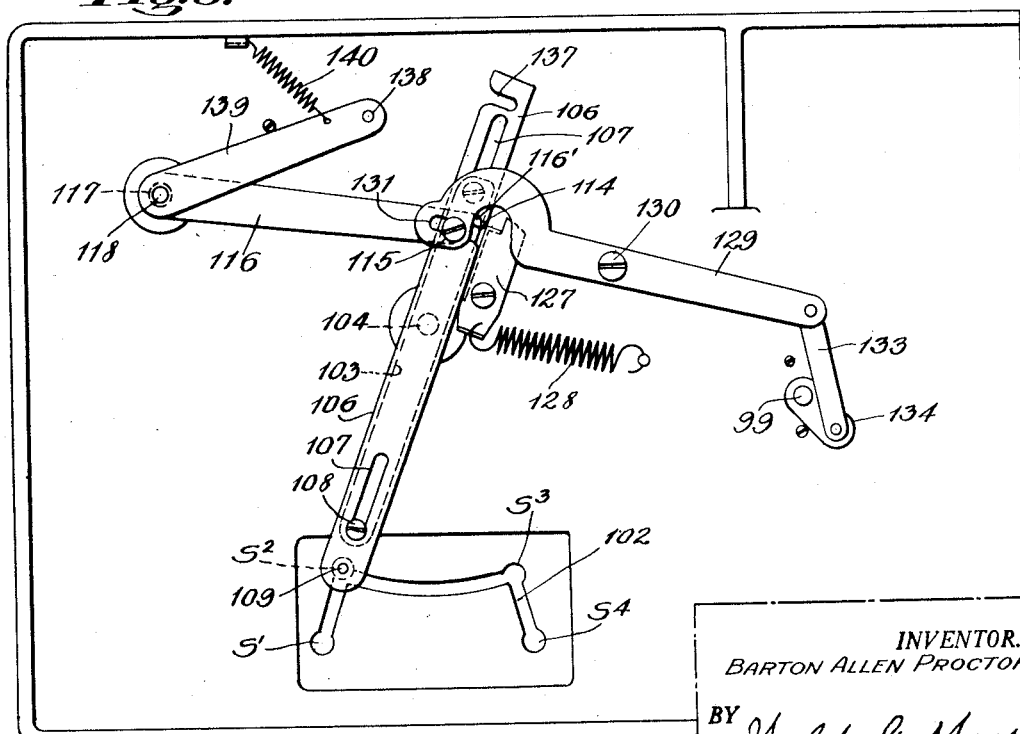
INVENTOR.
BARTON ALLEN PROCTOR
BY Waldo G. Morse
ATTORNEYS.

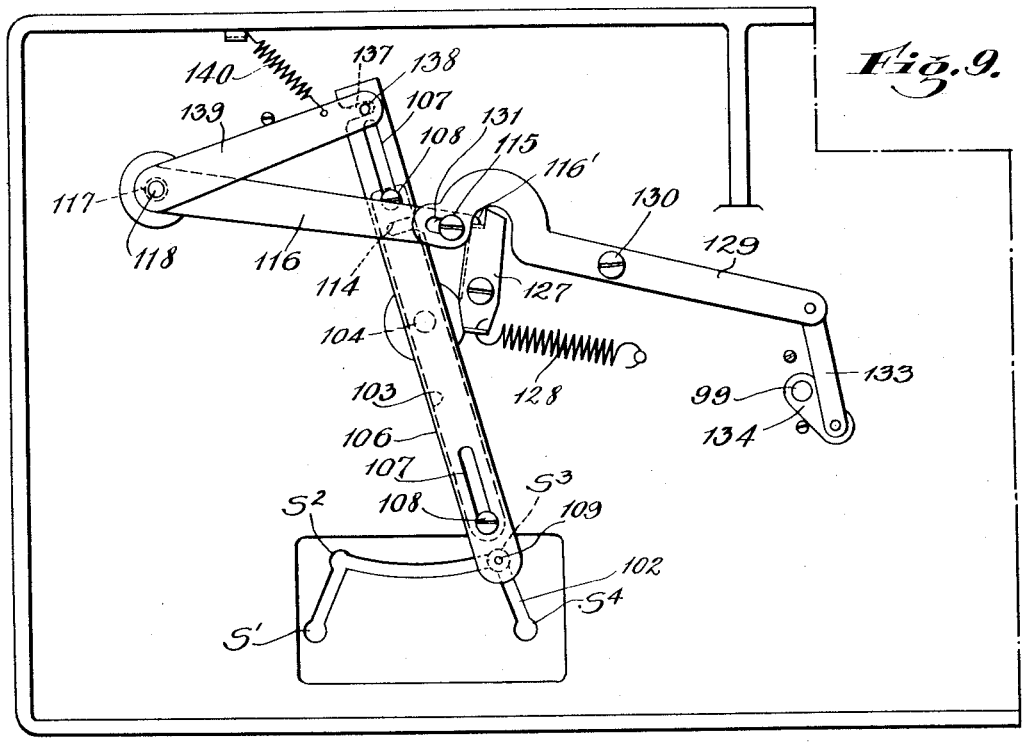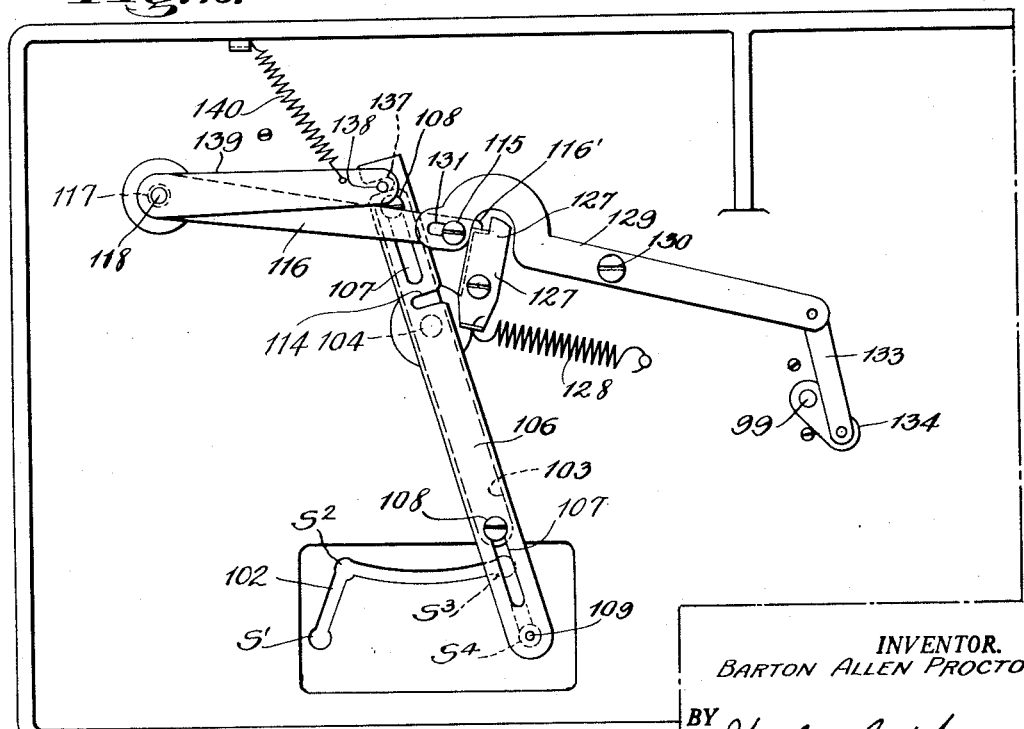

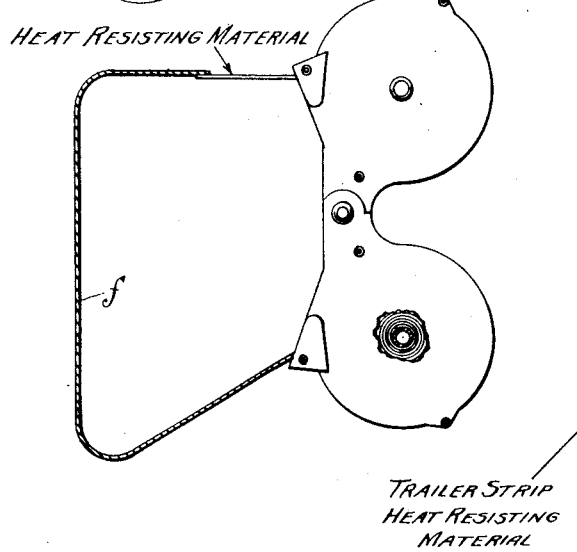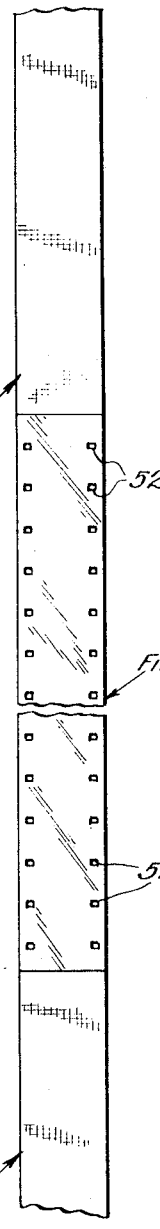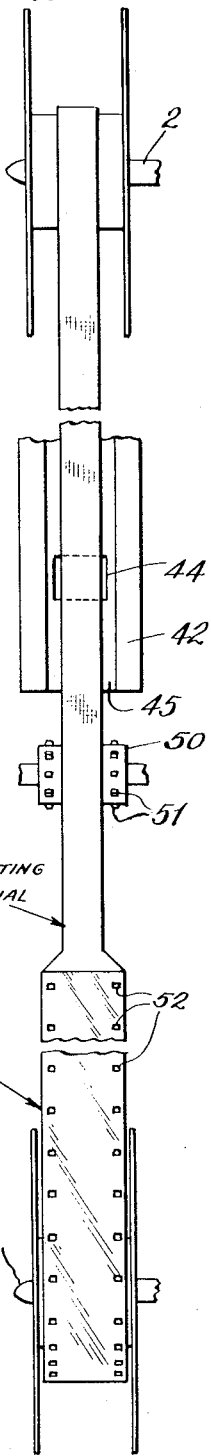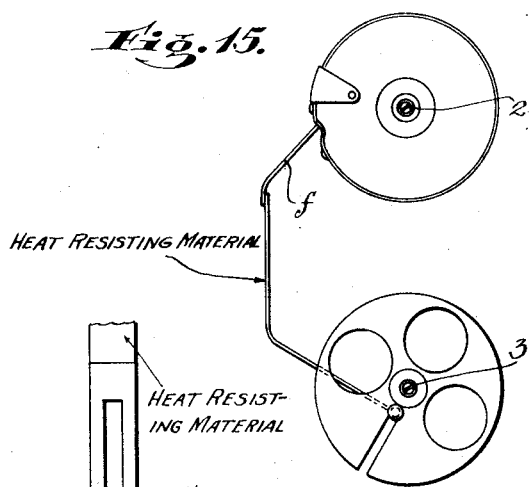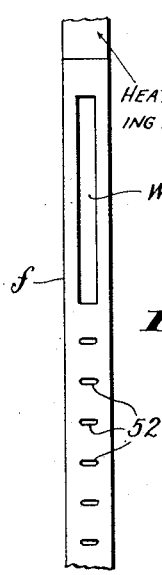

Patented Jan. 16, 1934

1,944,036

UNITED STATES PATENT OFFICE

1,944,036

FILM HANDLING APPARATUS

Barton Allen Proctor, Pelham Manor, N. Y., assignor, by mesne assignments, to Kinatome Patents Corporation, New York, N. Y., a corporation of New York Application January 16, 1929, Serial No. 332,880
Renewed August 25, 1933

30 Claims. (Cl. 88—17)

The present invention relates broadly to the art of photography and more particularly to improvements in the means adapted for the handling of films useful for the projection of pictures, either as so-called still or motion pictures.

The present application is a continuation in part of my co-pending application, Serial Number 54,910, filed September 8, 1925, Patent Number 1,894,963.

Heretofore in the art of film handling apparatus and particularly when adapted for projecting pictures, it has been customary for the user to thread the film into position by hand, clamping it manually upon various feeding devices. Since in the conventional apparatus, there has usually been no provision for the rewinding of the film after its projection without its removal from the apparatus, it has been the ordinary practice for the film to be wound loosely upon the supply or delivery reel, its inner end not being attached thereto, so that after the entire picture-bearing strip has been fed past the aperture, the end of the film, ordinarily spoken of as "trailer", is likewise fed through the machine and wound upon the take-up reel.

In my apparatus, however, such as that disclosed in the above mentioned application, I provide means for automatically threading the film into full operative relation with the mechanism and for rewinding it, as desired, without removal from the projector. To facilitate both this automatic threading and rewinding, I may use the film in a magazine of the double type or in a magazine of the single type such as those described in my co-pending application referred to or in an application filed concurrently with this application, Serial Number 332,881, Patent Number 1,871,234, or in Patent Number 1,871,237, both of said patents being continuations in part of my said Patent Number 1,894,963.

If used in any such container of the double type, each end of the film is permanently attached to its appropriate inner reel. If used in a single container, such as that disclosed in my said Patents Numbers 1,871,234 and 1,871,237 to which reference is made above, the end of the film which is last in order of projection is permanently attached to the inner reel. Thus after complete projection, the last or inner end of the film does not pass completely upon the take-up reel, as is common in the art, but remains stationary in the path of light. If this light is of high intensity, the heat will be sufficient to set the film on fire, if its base is such as one of cellulose nitrate, or to disintegrate it, if its base is such as one of cellulose acetate. Various means applicable to the projecting apparatus itself to protect the film from heat when it thus comes to rest have been proposed. In certain cases, however, I have found it more advantageous to supply a short length of heat resisting or fireproof material between the end of the picture bearing portion of the film and the supply reel from which it is unwound. That is, I make the so-called "trailer" of a fire resisting material and use it to attach the film permanently or semi-permanently to the supply reel.

As the film, if attached to the delivery spindle, comes to rest in the gate at the conclusion of the feeding cycle, the teeth of the sprocket or other feeding member may continue to operate, thus, if in engagement with the perforations of the film, tending to strain them if not actually to destroy them. Consequently I have found it desirable to attach the film to the delivery spindle by a strip which is so designed as to be free from engagement with the moving teeth, or so to construct the film itself that when it comes to rest at the conclusion of the feeding cycle, it is not in engagement with the teeth of the sprocket.

Under certain circumstances, also, it may be desirable to make use of a strip of heat resisting or fire-proof material at the beginning of the film, attaching it securely to the take-up reel. This material will serve to protect the film after rewinding has become complete or before the feeding of the projection cycle has begun, in such apparatus as that in which protection is not otherwise provided at this point.

In the art, it is well known to use leader and trailer strips of special construction. Strips of material heavier and stronger than celluloid have been used in order to withstand the harder wear which a film receives at the end, or so receives if used in conventional hand threaded apparatus. In such use of special strips protection against heat has not been contemplated. One early exponent of this practice even urged the treatment of linen, which relatively to any type of film is heat-resistant, with a dressing which would make it highly inflammable, although reducing the likelihood of stretching.

Special leaders have also been used as signalling devices to make clear to the operator which section would be manually placed in connection with which spocket or other moving element, how large the loops should be, and the like. Different colors have been so used.

My invention, however, is for entirely different uses and purposes.

Other and further advantages than those set forth above both of construction and operation will be apparent from the following specification and drawings constituting a part thereof. In these drawings there are shown for purposes of illustration only certain preferred embodiments of the present invention. It is understood that this specification including the drawings does not define the limits of my invention as changes therein may be made without departing either from the spirit of the invention or the scope of the broader claims.

In the drawings:

Figure 1 is a right side elevation of the machine, certain parts of the lamp housing being broken away;

Figure 2 is a left side elevation of the machine;

Figure 3 is a partial side elevation broken away to show actuating parts in film threading position, certain parts being omitted for clarity.

Figure 4 is a partial left side elevation broken away to show actuating parts in film threading position.

Figure 5 is a cross section on a line V—V of Figure 2 looking in the direction of the arrows;

Figure 6 is a partial view taken on the line VI—VI of Figure 1 showing the right side only to illustrate the gate;

Figure 6A is a detail view of the gate rod crank lever and associated parts;

Figure 7 is a partial bottom plan view showing actuating levers in "normal intermittent projection" position;

Figure 8 is a partial bottom plan view showing actuating levers in "still projection" position;

Figure 9 is a partial bottom plan view showing actuating levers in "film threading or changing" position;

Figure 10 is a partial bottom plan view showing actuating levers in "rewind position";

Figure 11 (Sheet 4) is a detailed view showing segment and pinion for actuating film-stripping shield;

Figure 12 (Sheet 4) is a front view of same, showing a sprocket adapted for use with a film having side perforations.

Figure 13 (Sheet 4) is a wiring diagram of the apparatus.

Figure 14 is an illustration of my use of a strip of fire-proof material in connection with a double magazine.

Figure 15 is an illustration of my invention as applied to a single film magazine of the type shown and claimed in my co-pending application Serial Number 232,881 which has matured as Patent Number 1,871,234 filed concurrently herewith.

Figure 16 is a view of a portion of film with a fire resisting trailer and leader strip.

Figures 17 and 18 are diagrammatic views showing a film with a fire-resisting trailer strip so designed as to be cut of engagement with the teeth of the sprocket when the film comes to rest in the gate after the conclusion of the projection cycle.

Certain of the features of the present invention, and more particularly those with respect to the automatic means for producing and maintaining the desired tension on the film are shown and claimed in the copending application of Clarkson U. Bundick and myself, Serial Number 44,482, filed July 18, 1925.

In carrying out the present invention there may be provided an apparatus comprising a supporting base B having mounted thereon a lamp L and resistance containing housing H and a supporting frame F upon which are mounted the operating parts of the film feeding and controlling mechanism per se.

Preferably carried by the frame F and projecting from one side thereof in predetermined spaced relationship is a pair of reel receiving spindles 2 and 3, the spindle 2 being adapted for the holding of a reel of film during the feeding movement thereof and adapted to effect rewinding of the film at the conclusion of the feeding movement, while the spindle 3 is adapted to be positively driven during the feeding movement for coiling the film as required.

The film itself may be carried in a combined storage and exhibiting container comprising a pair of containers 4 and 5 having a pivotal connection 6 whereby the containers may be relatively separated to a predetermined extent to expose the desired length of film therebetween, or it may be supported in any appropriate manner.

The spindle 3, which will hereafter be referred to as the driving or take-up spindle, is journaled for rotation in a suitable bearing 7 in the frame F. The opposite side of the frame is formed with an enlarged boss 7ª through which the spindle extends, and beyond the boss there is secured to the spindle a combined brake drum 8 and friction driving member 9. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14. Projecting rearwardly from the disk 11 is a circular series of driving lugs 15 conveniently in the form of closely spaced teeth adapted to be engaged by a clutch hereinafter described in detail by means of which the driving spindle 3 may be frictionally rotated through the friction surfaces just described.

Projecting from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located on one side of the frame F. This shaft at its forward end is mounted in spaced bearings 22 carried by the bracket 16 and is connected to a driving motor M through a flexible coupling 23 of any desired or usual construction. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pointed pins 26 slidable through the enlarged end 27 of the sleeve 24. By moving the collar 25 to the right as viewed in Figure 5, the pins 26 are projected to bring their pointed ends into engagement certain of the driving lugs 15 whereby a positive drive is immediately established for the driving spindle. This clutch will hereinafter be referred to as the driving spindle clutch.

The spindle 2, which will hereinafter be designated the rewinding spindle, or, when the context makes such phrasing desirable, as the delivery or supply spindle, is mounted similarly to the driving spindle 3 in a bearing 28 carried by the frame F, an enlarged boss 28' being provided coaxial with such bearing and spindle, and has secured to one end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch which may be generally similar in construction and operation to the construction of the driving spindle clutch. Upon movement of the collar 36 to the right as viewed in Figure 5, the pins 35 will be brought into the path of travel of the pin or lug 30 whereby the rewinding spindle 2 may be operated for effecting a rewinding of a previously displayed length of film.

For driving the shaft 31 there may be provided a collar 31' pinned to the shaft 31 and bearing against a flat spring 36' which forces a fibre disk 37' against a face of a pulley 37. The pulley 37 is mounted in line with a similar pulley 38 mounted on the outer end of a stub shaft 39 secured in the bracket 16. Also mounted on the shaft 39 is a spur gear 40 adapted to be driven by a similar, but preferably larger, gear 41 of the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

It will readily be understood by those skilled in the art that this provision of a yielding drive for the shaft 31 especially in combination with the belt and pulley drive, prevents the forward or "leader" end of the film which is attached to the take-up spindle 3 being torn loose therefrom at the conclusion of the re-winding cycle.

Mounted on the frame F adjacent the motor M is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section and intersecting the opening 44 for the travel of the film. Cooperating with the section 42 is a relatively movable section 46 preferably guided by a pin 47 projecting outwardly from the section 42, and secured to one end of the gate opening rod 48 slidable through a suitable opening in the gate section 42 and a suitable bearing 49 on the frame F. By reason of this construction, it will be apparent that when the rod 48 is moved to the left as viewed in Figure 1 it will be effective for moving the section 46 away from the section 42 to permit the removal of a film and the insertion of a new film, while movement in the opposite direction will bring the sections into cooperative relation.

For effecting the desired intermittent feeding motion of a film in position in the gate, there may be provided a feeding sprocket 50 having film engaging teeth 51 adapted to engage apertures 52 substantially peripherally positioned in the film f. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end of a grease casing C within which are mounted the cam 55 and star wheel 54, and at its opposite end journaled in a suitable bearing 57 carried by a bracket 58 projecting from the frame F.

Mounted loosely upon the shaft 56 adjacent the opposite end thereof, as illustrated in detail in Figure 3, is a pulley 59 with a long bearing 60 upon which is mounted the driving collar 61 from which project forwardly the clutch pins 62 through appropriate openings in the pulley 59. Pinned to the shaft 56 there may be provided the driven collar 63 to which there is attached one end of the spring 64, the other end of the spring being attached to the clutch element 65 to which there also is attached the driving block 66, the left-hand end of which, as viewed in Figure 3 of the drawings, being preferably wedge-shaped so as to slip by the end of the clutch pins 62.

Intermediate the gate section 42 and the objective lens O the shutter 68 may be positioned. This shutter may be mounted as in the casting 293 adapted to be secured directly to one side of the main frame F and over a shaft receiving extension 294 passing through an opening 295 in the frame. Mounted in the extension 294 is a shaft 296 carrying at one end a spirial gear 297 adapted to mesh with a suitable gear 298 on the shaft 56, preferably positioned within the casing C. The opposite end of the shaft 296 extends in to an enlargment 299 and is provided with a spiral gear 300 meshing with a suitable gear 301 on a longitudinally extending shaft 302. The shaft 302 at one end carries the shutter 68 which may be secured in position by the driving disk 303. The casting 293 may be shaped to receive the objective lens holder 292, or such holder, as illustrated in Figure 1, may be attached directly to the frame F.

It will be understood that the lubrication for the shafts 296 and 302 and the gears 297, 298, 300 and 201 is provided by the solidified oil or other suitable lubricant which fills the box C in which the cam 55 and the star wheel 54 are mounted.

Secured to the end of the driving shaft 21, and preferably substantially in line with the pulley 59 is a pulley 69 around which may pass a belt 70 for driving the pulley 59 from the drive shaft. By reason of this construction, it will be apparent that when the collar 61 and the pins 62 are moved to the right as viewed in Figure 3, the inertia of the spring 64 will be absorbed and rotation imparted to the shutter shaft 56 from the driving shaft 21, this rotation being effective for operating the shutter and for obtaining the desired intermittent operation of the film feeding mechanism.

It will readily be understood that rotation is not imparted to the shaft 56 and hence to the intermittently moving sprocket 50 until after the shaft 18 has been actuated. Power is directly communicated from the motor M through the coupling 23, shaft 21, worm 20 and worm wheel 19 to the shaft 18 and to the take-up spindle 3 through the previously described clutch, which is immediately operative. Power is communicated to the sprocket 50 through the intermittent train, to which reference has been made, the shaft 56, the previously described inertia-absorbing clutch, pulley 69, belt 70 and pulley 59, the latter being secured to power shaft 21. As a consequence it will be seen that the spindle 3 will begin to revolve before movement is imparted to the intermittent sprocket 50, to which reference has been made. It will be understood that the construction of the spring 64 may be such as to permit whatever period of dwell is desired as the power is applied. This timed relationship is important since it draws the film $f$ over the teeth of the sprocket and seats the same in the perforations of the film before the sprocket is placed in rotation. As a result injury to the film is avoided and wear upon it is minimized.

Cooperating with the sprocket 50 and normally occupying the position illustrated in Figures 1, 11 and 12 of the drawings, is a stripping shield 71 carried by the inner end of a pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counter-clockwise direction as viewed in this figure, thereby rotating the shield in a clockwise direction. This rotational movement of the shield will be effective for engaging the film $f$ and stripping the same from the sprocket preparatory to the removal of the film from the apparatus. It will remain in this position covering certain of the teeth of the sprocket during the application of a new film or during rewinding, whereby the threading operation of the film is greatly expedited, or the film protected during rewinding.

For further assisting the threading movement, the relatively fixed gate section 42 is provided with a projecting guide 80 having a generally curved contour for gradually feeding the film over the fixed gate section, the guide having a curved and inclined end 81 for insuring passage of the film over the sprocket and an oppositely inclined and curved end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting from one end of the movable gate section is a shoe 85 curved to generally conform to the curvature of the sprocket 50, the contour of the inner surface accommodating the teeth 51 of the sprocket. These guides and shoe cooperate in a manner, as will be readily apparent from the drawings, to permit a film to be positioned between the gate members by merely moving the same laterally relative to its normal direction of travel through the gate. The movement of the shoe 85, later described, is effective to place the film in operative contact with the sprocket 50. This greatly lessens the time required for threading new film into position, and enables the operation to be performed satisfactorily by an unskilled operator.

In order entirely to obviate the necessity of manually producing slack or loops as heretofore required, there is provided a tension control means of the general character set forth in the application before referred to. This tension control preferably includes braking means automatically operated by the film, and comprising a brake shoe 86 cooperating with the brake drum 29 on the rewinding spindle 2 and a brake shoe 87 cooperating with the brake drum 8 on the driving spindle 3. The brake shoe 86 by means of the resilient member 86' is attached to a brake lever 88 having a pivotal mounting 89 on the frame F and having secured to its opposite end a film guide 90, preferably constructed of a flat spring, projecting through a suitable opening 91 in the frame F. The brake shoe 87 is in turn preferably by means of the resilient member 87' attached to a curved lever 92 secured to a plate 93 loosely surrounding the boss 7$^a$ on the frame F whereby the plate as a unit may be rotated around this boss. At its opposite end the curved lever 92 is provided with a film guide 94, preferably constructed of a flat spring, projecting through a suitable opening 95 in the frame F. During the feeding of a film through the apparatus all of the parts occupy the position illustrated in Figure 1 while during the threading of a film into position or the removal of a film from the apparatus, the parts occupy the position illustrated in Figure 3. In this latter position it will be noted that the guide 94 occupies such a position with respect to the curved end 84 of the guide member 83 as to insure the passage of a film around the guide 94 automatically upon lateral movement of the film, while the guide 90 occupies such a position with respect to the inclined curved upper end 82 of the guide member 80 as to insure passage of a film over and around the guide 90 by the operation referred to.

As power is applied to the sprocket 50, the sprocket revolves and the film is pulled from the spindle 2, the arm 88 is depressed and energy is stored in the spring 96. This movement of the film may be cushioned by the operation of the flat spring 90. While the sprocket 50 is at rest, the spring 96 acts on the arm 88 to cause an amount of the film to be pulled from the spindle 2. The magnitude of the flat spring 90 may be so determined that the flat spring will assist in the above described auxiliary feeding operation. Upon the next rotation of the sprocket 50, the film is again fed forwardly, the portion necessary to compensate for the displacement caused thereby being the length of film previously pulled from the spindle 2 and that which is at that moment pulled from the spindle 2. This movement of the film again moves the arm 88 to store power in the spring 96 which is used during the next period of rest of the sprocket 50 to pull more film from the sprocket 2, and the foregoing cycle is repeated throughout the entire period of operation.

In addition to the operation above described, the lever 88 and its associated parts perform a braking function. The lever 88 is normally swung in such direction as to cause the brake 86 to contact with the drum 29 by means of the spring 96. Due to the action of this spring, the brake 86 tends to prevent too free rotation of the rewinding shaft and thereby prevents the tension on the film becoming less than that required for proper feeding. In the event, however, of a tendency toward too great tension, the tension on the film causes the lever 88 to move in opposition to the action of the spring 96, thereby relieving the braking action of the brake 86 to a corresponding extent and again producing the desired tension on the film.

The operation of the arm 92, the yielding film pad 94, the take-up spindle 3 and the sprocket 50 is analogous to that which has just been described for the elements between the sprocket 50 and the supply spindle 2. As the sprocket 50 revolves, a portion of the film is moved forwardly. The resilient end of the spring arm 87' aided if desired by the resilient pad 94, holds the film constantly under tension. The spindle 3 yieldingly but continuously driven pulls the film onwardly and coils it up. This operation tends to move the arm 92 against the pressure of the spring 87' and tends, also, to compress the flat spring 94. Thus, there is stored an amount of energy which during the next period of rest of the sprocket 50 is sufficient to maintain the tension upon the film F. As the spindle 3 revolves during the period of rest of the sprocket 50 a direct pull upon the perforations of the film seated upon the teeth 51 of the sprocket is prevented by the cushioning effect of the spring 94 and the frictional drive of the spindle 3.

In addition to the auxiliary feeding operation above described, the arm 87' and its associated parts perform a braking function.

The lower brake 87, is normally so positioned as to exert no appreciable braking action on the drum 8. In the event, however, of a tendency toward undue tension on the film between the feeding sprocket 50 and the reel carried by the driving spindle 3, the film will be effective for swinging the lever 92 in such direction about its pivotal mounting 97 on the plate 93 as to bring the brake 87 into more effective braking engagement with the drum 8. Due to the fact that the spindle 3 is driven from the motor through a friction drive, this braking action will be effective for decreasing the driving force on the spindle 3, and consequently will relieve the tension on the film and produce the desired operating conditions between the sprocket and the lower reel.

The braking operation above described is of great usefulness where abnormal conditions of feeding arise, such as for example the binding of a shaft from any cause, such as lack of lubrication or a piece of grit, or sudden acceleration or deceleration of the intermittent sprocket 50 owing to a sudden change in the voltage applied to the motor M or other temporary characteristic of feeding. Applicant has been able successfully to feed film without the use of the braking means in addition to the primary tension controlling means but he prefers to use both means.

In this manner the required tension on the film to insure proper feeding is automatically produced by the mere threading of the film into position, and is automatically maintained by the operation of the tension or braking mechanism.

When the apparatus is utilized for so-called "still" projection of pictures, it is necessary to provide means in the path of travel of the light rays for protecting the film against danger of injury by reason of undue temperature conditions. For effectively shielding the film during such period, there is provided a trap or shield 98 composed of suitable material such as copper screen of suitable mesh carried by a shaft 99 having one end journaled in a bearing 100 projecting from the frame F and having its other end suitably journaled in the supporting base B. This shaft is adapted to be periodically operated in accordance with the character of operation of the machine for bringing the shield positively into position when the apparatus is operating for the still projection of pictures and to throw it out of position for the projection of pictures in motion.

For controlling the operation of the apparatus in the manner desired there is preferably provided a single control member in the form of a knob or button 101 projecting through a substantially U shaped slot 102 in the supporting base B. This slot is so shaped as to provide four operating stations designated, respectively, S1, S2, S3 and S4. The button 101 is adapted to be moved at will so as to occupy any one of these stations. With the button at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from Station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding.

The control mechanism actuated by the control knob is to a large extent shown in Figures 7, 8, 9, and 10 inclusive, which illustrate in succession the change in the position of the parts of the control mechanism by movement of the control button successively to the respective stations. This mechanism may comprise a lever 103 keyed or otherwise secured to one end of a brake release rod 104 journaled in any desired manner in the base B, the other end being journaled in a bearing bracket 105. Being secured to the brake release rod 104 which is capable only of a turning movement about its longitudinal axis, the lever 103 is restricted in its movement to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At one end the lever 106 carries a pin 109 having a head 110 against one side of which bears one end of a compression spring 111. The opposite end of this spring bears against a flange 112 extending inwardly from the control button 101. By reason of this construction it will be apparent that the button may be moved axially on the pin 109 but the spring 111 will normally be effective for urging the button toward the base B. The button has a collar 113 of a diameter to substantially conform to the contour of the slot 102 at the respective operating stations, whereby with the button in its normal position accidental movement from one of these stations is prevented.

At a point intermediate its length the combined rotating and sliding lever 106 is provided with a transversely extending recess 114 adapted to cooperate with a pin 115 projecting from a lever 116 which is secured adjacent one end of a control sleeve 117 surrounding a control rod 118, the sleeve and rod extending through the base B and journaled for rotational movement in bearings 119 carried by the bracket 16 and by a bearing 120 carried by the bracket 33. Adjacent one end the control sleeve 117 has projecting therefrom forked operating arms 121 carrying projecting pins 122 adapted to normally lie in the groove 123 of the clutch member 62 on the shutter shaft 56. By reason of this construction it will be apparent that upon rotation of the sleeve 117 in a counter-clockwise direction, as viewed in Figure 7, the clutch pin 62 and the block 66 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch to thereby permit the driving spindle to move freely in either direction. Engagement of the driving spindle clutch and the shutter shaft clutch will be effective for the so-called projection of pictures in motion but this engagement is not required for still or stereopticon results. The operation of the sleeve 117 is obtained by moving the control button from station S1 to station S2, or from the position shown in Figure 7 to the position shown in Figure 8, by reason of the relative movement imparted to the sleeve due to the sliding action of the lever 106.

Pivotally mounted adjacent the side of the combined sliding and swinging lever structure is a detent 127. One end of this detent has connected thereto one end of a tension spring 128, the opposite end of which is secured to a suitable projection on the base B of the apparatus. The spring normally tends to swing the detent in a counter-clockwise direction about its pivotal mounting as will be apparent from the drawings.

It will be readily understood that at the conclusion of the projecting cycle, although the control mechanism may remain in the position described above, the film is protected from injury. The driving spindle continues to rotate, but the frictional driving connection for the driving spindle 3, previously described, materially lessens the strain upon the film. Experience has shown, however, that such protection is not in itself always sufficient. Consequently under certain conditions it may be well to employ a film so narrow or so shaped, as hereinafter described in detail, that in that portion which comes to rest in the gate at the conclusion of the feeding cycle, there is no engagement between the teeth of the sprocket or other feeding means and the film.

In changing from the normal projection to the projection of still pictures, it is also necessary to move the shield or screen 98 into position. This is positively accomplished simultaneously or in timed relation with the rotation of the sleeve 117, through the medium of a lever 129, pivoted at its intermediate portion on a stud pivot 130, secured in the base B. At one end the lever 129 has a slot 131, within which projects the pin 115 on the lever 116. At its opposite end, the lever 129 is pivotally connected to a link 133, the opposite end of which is connected to a crank arm 134, secured to the lower end of the shaft 99. The opposite end of the lever 129 is curved to provide a recess, as clearly shown in the drawings, adapted to permit the desired operation of the detent 127 without interference therewith. Through the medium of the mechanism just described, the movement of the lever 106 from station S1 to station S2 will rotate the lever 129 in such direction as to swing the heat shield into light-intercepting position. It will be noted that this movement of the light shield takes place positively in timed relation to the movement of the operating parts necessary in obtaining still projection, and thereby eliminates any possibility of injury to a film from the heat of the light source while the film is stationary.

It may be assumed that after the single projection of a film, or the repeated projection thereof, it is desired to change the same, or that in starting it may be necessary to move the parts of the apparatus into such position that a film may be threaded into position therein. Under such circumstances, the control button will be moved from station S2 to station S3. This movement will be effective only for rotating the brake release rod 104 and for bringing a recess 137 in the lever 106 into cooperative engagement with a pin 138, projecting from a lever 139, secured one end of the control rod 118.

The lever 139 is normally held in the position shown in Figures 7, 8 and 9 by a tension spring 140, which may be secured in any desired manner to the base B of the apparatus. In this position, the pin 138 will be received by the slot 137 when the parts are rotated in the manner described.

At the commencement of the movement from station S2 to station S3, the combined swinging and sliding lever structure will be moved away from the detent 127, thereby permitting it to swing in a counterclockwise direction under the influence of its tension spring. This movement will be effective for bringing the notched end of the detent into engagement with the projection 116' of the end of the lever 116, whereby the lever 116 and its associated parts will be held in the proper position.

The rotation of the brake release rod is effective for opening the gate sections of the gate, for moving the brakes 86 and 87 and their associated parts to inoperative position and for so actuating the stripper shield 71 as to effect the desired bodily removal of a film from the sprocket 50 or the shielding of the sprocket to permit the threading of a new film into position. These operations are obtained by securing to the upper end of the brake release rod a pin 141 extending into a slot 142 in one arm of a bell-crank lever 143, having a pivotal mounting 144 on the frame F. The opposite end of the bell-crank lever is in cooperative engagement with one end of a link 145 movable through a slide or guide 146 and having one end bent to extend over the brake lever 88. Movement of the control button from the station S2 to the station S3 will be effective for rotating the brake release rod 104 in a counter clockwise direction, as viewed in Figure 9, thereby rotating the bell crank lever 143 in a counter-clockwise direction, as viewed in Figure 4, and consequently, rotating the brake lever 88 about its pivotal mounting 89 in opposition to the spring 96 for moving the brake 86 to inoperative position.

Movement of the lower brake is obtained simultaneously with actuation of the upper brake through the medium of a crank lever 147, secured at an intermediate point to the brake release rod. This crank lever has a slot 148 in its free end into which projects a pin 149 carried by the gate control rod 48. The right hand end of the gate control rod as viewed in Figure 3, is connected by a link 150 with the plate 93, whereby said plate and the gate control rod operate in unison. Movement of the brake release rod occasioned by operation of the control button from station S2 to station S3 is effective for rotating the plate 93 and all parts carried thereby in such direction as to move the film guide 94 in the slot 95 and bring it into such cooperative relation to the guides 80 and 83 as shown in Figure 3, as to facilitate the removal of a film or the positioning of another film. This movement of the gate control rod will also tend to separate the gate sections and will move the shield 71 into stripping and shielding position, as will be obvious.

If it is not desired to change a film, the control button may be moved from station S3 to station S4, or may be moved from station S2 to station S4 without stopping at station S3. This movement will be effective by reason of engagement between the recess 137 and the pin 138 for rotating the control rod 118. At its free end, this control rod carries spaced arms 151, similar to the arms 121 and 124, previously described, and provided with pins 152, normally lying in the groove 153, in the rewinding clutch collar 36. The rotation of the control rod 118 as occasioned by the movement of the control button from station S3 to station S4 will be such as to move the rewinding clutch into operative position, whereby the spindle 2 is connected in driving engagement with the shaft 31, this engagement being such that the film may be rewound by the continued operation of the motor M. It will be readily understood that any undue strain upon the film during or at the conclusion of the rewinding cycle is obviated not only by the slippage between the driving pulley 37 and the collar 31', but also by slippage between the belt and its pulleys 37 and 38 previously described.

During this time, the spring 140 will be held under tension in such manner that should an operator fail to completely position the button at the station S4, the spring will be effective for automatically restoring the parts to an inoperative position as station S3.

From the foregoing, it will be apparent that the operation of a single control button performs in succession the necessary changes in the operating positions of the various parts for permitting any desired condition of operation of the apparatus. Upon movement of the control button from station S4 to station S3, the rewinding clutch will be disengaged and the lever 139 held in position by the spring 140. Upon movement from the station S3 to the station S2, the recess 137 will leave the pin 138 and the brake release rod 104 will be rotated in the opposite direction to that heretofore described.

During this movement, the combined swinging and sliding lever structure will come into engagement with the detent 127 and swing it in a clockwise direction against the action of its controlling spring 128, to thereby release the projection 116' from the holding action of the detent, and permit the lever 116 and its associated parts to be subsequently moved as required, upon movement of the control button from station S2 to station S1. Such movement of the button will swing the lever 116 in the opposite direction to that previously described, and thereby effect re-engagement of the shutter clutch and of the driving spindle clutch. At the same time, lever 129 will be restored to its original position, thereby, in turn, effecting movement of the heat shield to inoperative position.

Carried by the frame F and positioned in line between the filament of the light source L and the aperture 44 of the gate is a condensing lens 161' carried by the lens casing 161. This condensing lens as is usual in the art concentrates the light upon the aperture. Forward of the gate the objective lens O may be positioned as for example within holder 292.

The combined lighting resistance and ventilating unit is contained within the housing H. Within this housing is mounted in any desired manner a lamp C adjustably carried by a bracket 162 having a pivotal mounting 163 in a bracket 164. Also having a pivotal mounting in the bracket 164 is a reflector R.

Secured to one side of the housing is a resistance carrying unit 165 carrying a suitable resistance for the lamp L. Also mounted on the housing, and preferably exteriorly thereof, is a second resistance 166 with which cooperates a control finger 167 by means of which resistance may be cut into or out of the motor operating circuit at will.

The resistance 165 may be originally proportioned with respect to the circuit with which the apparatus is to be used and therefore requires no adjustment. At times, however, it is preferable to operate the apparatus at varying speeds and by means of the rheostat or resistance 166 this may be effectively accomplished.

In accordance with the present invention, as is clearly shown in Figures 14 to 17 inclusive, I provide a film f, which extends from the point of attachment upon or in connection with the supply spindle 2 of the apparatus to the point of attachment at or in connection with the take-up spindle 3 of the apparatus. This first mentioned point of attachment may be a reel of the conventional type contained within a double magazine such as that shown in Figure 14 of the drawings or a single magazine such as that shown in Figure 15 of the drawings, or it may be any type of reel or similar container used either within an outer enclosing container such as a magazine, or upon an open reel of the conventional type. Between the body of the film f and this point of attachment I place the section of heat resisting material. Likewise the film may be attached to the take-up or driving spindle by means of a length of heat resisting material.

By means of this construction, when the film has reached the limit of its travel in one or both directions, the heat resisting material will be in position opposite the aperture 44 to intercept the rays from the light source, and thus insure safety to the film against damage from heat.

Such heat resisting material may be of any substance the characteristics of which are such that when it comes to rest in the path of light of the projection apparatus, it does not burn, disintegrate, lose shape, warp, or otherwise become harmed. I have found many different substances useful for this purpose. I have used strips of linen, cotton and silk impregnated with chemicals such as give to the particular fabric which I employ suitable heat resistant characteristics. The particular chemical which I use depends upon the characteristics of the fibers of the fabric which I select and the intensity of the light source. Also the strength of the solution in which I immerse the fabric is determined by these factors.

Under certain conditions, I have used a solution of finely ground sodium silicate. Aluminum acetate, although less readily soluble, may under certain circumstances be used diluted with not to exceed forty times its volume of water. Also, I have found the following formula effective under certain conditions:

| | |
|---|---|
| Alum | 160 grams |
| Ammonium carbonate | 50 grams |
| Boric acid | 30 grams |
| Borax | 35 grams |
| Water | 2,000 cubic centimeters |

It will be understood that the chemical which I employ and the method of its use do not form a part of the present invention and that I state the use of sodium silicate and aluminum acetate and the above formula merely for the purposes of illustration as any suitable formula may be employed.

Under certain conditions, I may use a heat resisting tape woven from threads or wire of a fire-proof metal, these threads or wires preferably being thin and soft, and from threads of organic material, such as cotton, linen or silk. Such organic threads need not be treated chemically if the heat to which they are exposed is not too great and the period of exposure is not too long. The metal wire under such circumstances acts to conduct the heat from the tape at the aperture to the other portions of the tape and to the body of the machine, thus protecting the organic threads. It will be readily understood that the use of such threads in the tape gives it a softness and pliability which would otherwise be lacking, these characteristics being useful to protect the apparatus from scratching and to protect the film itself when rolled about the tape and to render such rolling and unrolling without difficulty.

If a light source of greater intensity is used, I find it desirable to treat these organic threads with a chemical which increases their heat resisting characteristics. Such treatment is generally desirable, for example, when the light source is capable of producing a picture at about thirty feet which registers over twenty-four lumens.

Since an organic fabric or organic threads treated as above tend to lose their heat resisting qualities after two or three years and are not literally fireproof, under certain conditions I have found it desirable to use thin strips of fire-proof metal or tape woven from threads or wire of fireproof metal. In the choice of material for such use I give attention to its physical characteristics when under the influence of heat. While the metal, if used in a strip instead of being woven, must be fire-proof and of such characteristics that it rolls readily about the reel mounted upon spindles 2 or 3, it must be of sufficient body so that under the influence of heat it does not tend to warp, curl or buckle. Consequently I have found it desirable under certain conditions to use a relatively thick strip but one of such softness as to roll readily and not to break when rolled.

It will be readily understood that my invention is not limited to the use of any specific substance to which reference is made herein, since any suitable fire resisting material may be employed.

The film may be directly attached by a suitable adhesive mixture or device to the fire resisting strip. For use with the fabric tape or tape made of fire-proof metal and organic threads mentioned above, I have found ordinary surgeon's tape to be effective. I have also found it practical to attach the film to the metal tape by riveting. In such cases it is desirable to use a rivet with a rather large head and to bring the head well into contact with the film in order to minimize the danger of the film tearing out.

As is clearly shown in Figures 16, 17 and 18 of the drawings, I so construct the inner end of the film or of the heat resisting trailer, that is, the portion of the film or trailer adjacent the delivery spindle, that when it comes to rest in the gate at the conclusion of the projecting cycle the teeth of the sprocket or other film moving element are not in operative engagement with the trailer. To accomplish this result, if I am using a film with center perforations as is shown for example in Figure 18 of the drawings, I form an opening or window W in the center of the film so that when that portion of the film is drawn into position over the teeth 51 of the sprocket 50 the teeth of the sprocket can continue to revolve freely without being in contact with the film or trailer. In case I use a film with perforations along the edges as is more common in the art at the present time, I narrow that portion of the film or tape which will come to rest at the conclusion of the projection cycle adjacent to the teeth of the sprocket or other moving element as shown in Figure 17, so that these teeth as they continue to move will not be in contact with the film or trailer.

It will be readily understood by those skilled in the art that the continued actuation of the sprocket if the teeth were in contact wtih the film or trailer, they would tend to enlarge the perforations therein or to tear them out completely, thus ruining this portion of the film or trailer.

Under certain conditions, I also construct the outer end of the film or of the heat resisting leader, that is the portion of the film or leader adjacent the take-up or driving spindle, in a similar manner so that at the conclusion of the rewinding cycle the teeth of the sprocket are not in operative engagement therewith.

As will be understood from the foregoing description and the drawings, in apparatus constructed according to my invention, at the initiation of the projection cycle the take-up spindle 3 begins to revolve before the actuation of the film moving sprocket 50. The operation of the spindle 3 may therefore be effective to pull the unperforated portion of the film or leader over and past the sprocket and to place the perforated portion upon the sprocket before or just as the sprocket begins to revolve, thus starting the feeding operation without injury to the film or leader.

If I desire to omit the heat shield 98 which has previously been described, which protects the film from the heat of the light source at the conclusion of the rewinding cycle and previous to the initiation of the projecting cycle, I may use such a leader of heat resisting material which is of sufficient length to reach to a point above the aperture 44. In such case I may construct the clutch for the shutter shaft 56, with a spring 64 of such magnitude as to permit slippage for an interval of time sufficient for the take-up spindle 3 to have wound sufficient of the unperforated leader or film so that the perforated portion is brought into contact with the sprocket 50 before the sprocket is actuated.

It will be readily understood that the window W may be placed either in the film itself or in the heat resisting tape by means of which the film is attached to the delivery spindle. Likewise the film itself may be narrowed in case the side perforations are used, or the tape which is employed may be of a width less than the distance between the teeth 51. With the use of a film of sixteen millimeters in width with side perforations, such as is commonly employed in apparatus constructed according to my inventions, I have found the use of such narrow heat resisting tape the most desirable practice.

It will be readily understood by those skilled in the art that the combination of heat resisting material which comes to rest in the aperture following either the projection or rewinding cycle and of means such as the narrowing of this tape or the provision of a window, forms a combination which accomplishes a result new and useful in the art. Under ordinary conditions of film feeding if the projection mechanism continues to operate at the conclusion of projection of a film which is attached to the delivery spindle, the strain upon the perforations is generally such as to tear the film from the delivery spindle and to prevent the carrying out of the object which led to the attachment of the film to the delivery spindle. Likewise if the heat resisting tape is not used, if a light source sufficient to give a picture which falls into a class other than that of a toy is employed, the film is almost certain to disintegrate or to be greatly weakened by heat thus again making it impossible for the accomplishment of the object which has led to the attempt to use a film permanently attached to the delivery spindle.

It will be readily understood, also, that the combination of these two protective means, that is means to prevent damage to the film from the heat of the light source and from the teeth of the sprocket, at the conclusion of the rewinding cycle and prior to the initiation of the projecting cycle, makes it practical to employ a film one end of which is attached to the delivery spindle and the other end of which is attached to the take-up spindle, in connection with a powerful light source without the provision of an automatically operated heat screen. Although I prefer to rewind the film clear of engagement with the teeth of any sprocket, it is a common practice in the art to rewind a film by merely reversing the mechanism by which it has been fed in the projecting cycle. The usefulness of the double protective means in connection with such practice is obvious.

It will be readily understood, also, that the provision of a yielding drive for the re-winding spindle whereby the film is not torn loose from the take-up spindle at the conclusion of the rewinding operation directly cooperates with the two protective measures to which reference has been made above. Applicant has found that if a film one end of which is attached to the supply or rewinding spindle and the other end of which is attached to the take-up spindle is to be used without danger of injury provision must be made for protecting the film at the conclusion of the rewinding cycle from the heat of the light source, from the teeth of the intermittent feeding means, and from the traction of the rewinding spindle.

Similar protection is necessary at the conclusion of the projecting cycle. The present invention includes among its advantages the provision of these protective means.

Other advantages of my invention arise from the provision of a heat resisting trailer or leader particularly for use with film one end of which or both ends of which are firmly attached to a spindle of the apparatus so that at the conclusion of the feeding or rewinding cycle the trailer or leader comes to rest in the path of light thus obviating the exposure of inflammable or easily disintegrated film when stationary to the heat of the light source. Still further advantages arise from the construction of that portion of the film adjacent the delivery spindle or of such heat resisting material adjacent said spindle so that the continued operation of the feeding mechanism can not damage it. Additional advantages have been pointed out in the foregoing specification.

I claim:

1. In a film handling apparatus having a source of light, an aperture, a delivery carrier, a take up carrier, and means creating a film work path between said carriers, in combination, a film having one end fastened to said delivery carrier and extending therefrom along said film work path past said aperture and to said take up carrier, the end portion of said film which is fastened to said delivery carrier being constructed of heat resisting material, said heat resisting end portion having a length sufficient to extend from said delivery carrier along said film work path past said aperture.

2. In a film handling apparatus having a source of light, an aperture, a delivery carrier, a take up carrier, and means creating a film work path between said carriers, in combination, a film having one end fastened to said delivery carrier and the other end fastened to said take up carrier, said film including a first heat-resisting portion fastened to said delivery carrier and having a length sufficient to extend from said delivery carrier along said film work path past said aperture, said film further including a second heat resisting portion fastened to said take up carrier and having a length sufficient to extend from said take up carrier along said work path past said aperture.

3. Film handling apparatus including a carrier and a tape, said tape being constructed of strands composed of a fire-resisting metal and strands composed of organic material, said strands being woven together and said tape being arranged with one end secured to said carrier and the other end secured to one end of a film adapted for use in said apparatus.

4. Film handling apparatus including a carrier and a tape, said tape being constructed of threads composed of a fire-resisting metal and threads of linen woven together and being arranged with one end secured to said carrier and the other end secured to one end of a film adapted for use in said apparatus.

5. Film handling apparatus including a carrier and a tape, said tape being constructed of threads composed of a fire-resisting metal and threads composed of linen woven together, said threads of linen having been treated with a preparation adapted to increase the heat-resisting characteristics thereof, and said tape being arranged with one end secured to said carrier and the other end secured to one end of a film adapted for use in said apparatus.

6. For use in a projection apparatus, in combination, a ribbon composed of image-bearing cellulose material and a tape constructed of metallic and organic threads woven together and arranged with one end secured to one end of said ribbon.

7. For use in a projection apparatus, in combination, a ribbon of image-bearing cellulose material and a tape composed of metallic and organic threads woven together and arranged with one end secured to one end of said ribbon, said organic threads having been treated with a preparation adapted to increase the heat-resisting characteristics thereof.

8. Film handling apparatus, comprising two film carriers, a first length of material composed of metallic and organic strands, one end of said first length being secured to one end of a film and the opposite end of said first length being secured to one of said carriers, a second length of material composed of metallic and organic strands, one end of said second length being secured to the end of the film opposite that to which said first length is secured and the opposite end of said second length being secured to the carrier other than that to which said first length is secured, and means for feeding the film from either of said carriers to the other.

9. Film handling apparatus, comprising two film carriers, a first length of material composed of metallic and organic strands, one end of said first length being secured to one end of a film and the opposite end of said first length being secured to one of said carriers, a second length of material composed of metallic and organic strands, one end of said second length being secured to the end of the film opposite that to which said first length is secured and the opposite end of said second length being secured to the carrier other than that to which said first length is secured, and means for feeding the film from either of said carriers to the other, said organic strands of each of said lengths having been chemically treated whereby the heat resisting characteristics thereof have been increased.

10. Film feeding mechanism which comprises a carrier, an apertured gate, a toothed member for feeding a perforated film therethrough by engagement between a tooth of said member and perforations upon one edge of the film and by engagement between another tooth of said member and perforations upon the opposite edge of the film, said member being disposed on the side of the aperture of said gate opposite that on which said carrier is disposed, a source for directing light upon said aperture, and a tape of heat resisting material, said tape being arranged with one end thereof secured to one end of the film and the opposite end thereof secured to said carrier, said tape being constructed of a width less than the axial distance between the teeth of said feeding member whereby driving engagement between said member and said tape is precluded and of a length at least as great as the distance between said member and said carrier, whereby, when the film and said tape come to rest in said mechanism through such precluding of such driving engagement, said material is situated opposite the aperture of said gate.

11. Film handling apparatus comprising a delivery spindle, an apertured gate, a source which directs light upon the aperture of said gate, a take-up spindle, means to move a film from said delivery spindle through said gate past the aperture thereof to said take-up spindle to feed the same, means to move the film from said take-up spindle through said gate past the aperture thereof to said delivery spindle to rewind the same, and means to prevent damage to the film from the heat of said light source at the conclusion of each of said cycles of movement, said means effective at the conclusion of such feeding cycle comprising a strip of heat resisting material, said strip being arranged with one end thereof attached to said delivery spindle and the opposite end thereof attached to one end of the film, and said strip being constructed of a length at least as great as the distance between said delivery spindle and the aperture of said gate whereby at the conclusion of such feeding cycle said material is positioned at such aperture, and said means effective at the conclusion of said rewinding cycle including a heat shield, means whereby said shield is moved from a position outside of the path of light from said source to said aperture into a position within such path intercepting such light, and control means interlocking said rewinding means and said heat shield, said control means, said heat shield and said rewinding means being so constructed and arranged that prior to the conclusion of such rewinding cycle said heat shield is necessarily positioned in such light intercepting position.

12. In combination, film feeding apparatus and protective mechanism for a film fed thereby; said apparatus comprising a delivery spindle, an apertured gate, a take-up spindle, a toothed member adapted to engage the perforations of a film for feeding the same from said delivery spindle through said gate past the aperture thereof toward said take-up spindle, a source for directing light upon the aperture of said gate, and means for rewinding the film from said take-up to said delivery spindle; said protective mechanism comprising a tape composed of heat resisting material, a heat shield movable into and out of position between said aperture and said light source, and control means interlocking said shield and said rewinding means, said tape being arranged with one end attached to said delivery spindle and the opposite end thereof attached to one end of the film whereby at the conclusion of such feeding operation said strip comes to rest opposite said aperture and adjacent said toothed member and said tape being so constructed that driving engagement between the same and said toothed member is precluded, whereby at the conclusion of such feeding operation the film is not torn loose from said delivery carrier, and said shield, said rewinding means, and said control means being so constructed and arranged that at the conclusion of said rewinding cycle said heat shield is necessarily positioned between said light source and the film.

13. In combination, film feeding apparatus and protective mechanism for a film fed thereby; said apparatus comprising a source of power, a delivery spindle, an apertured gate, a take-up spindle, a toothed member adapted to engage the perforations of a film, means for connecting said member and said take-up spindle with said source of power whereby the film is fed from said delivery spindle through said gate past the aperture thereof and wound upon said take-up spindle, a source for directing light upon the aperture of said gate, means for connecting said delivery spindle with said source of power whereby the film is rewound from said take-up spindle through said gate and wound upon said delivery spindle; said protective mechanism comprising a take composed of heat resisting material, a heat shield movable into and out of position between said aperture and said light source, control means interlocking said shield and said means for connecting said delivery spindle with said source of power, and a yielding motion transmitting member between said source of power and said delivery spindle; said tape being arranged with one end attached to said delivery spindle and the opposite end attached to the film whereby at the conclusion of such feeding operation said tape comes to rest opposite the aperture and adjacent said toothed member and said tape being so constructed that driving engagement between the same and said toothed member is precluded, whereby at the conclusion of such feeding operation the film is not torn loose from said delivery spindle, said shield, said means for connecting said delivery spindle with said source of power, and said control means being so constructed and arranged that at the conclusion of said re-winding cycle said heat shield is necessarily positioned between said light source and said film, and said yielding member being so disposed between said source of power and said delivery spindle that at the conclusion of such re-winding cycle the traction exerted by said delivery spindle upon the film does not exceed a predetermined maximum and the film is not torn loose from said take-up spindle.

14. Film handling mechanism comprising a delivery spindle, one end of a perforated film being attached to said delivery spindle, a take-up spindle, an apertured gate therebetween, means including a toothed member for feeding the film by engagement between the teeth thereof and the perforations of the film from said delivery spindle through said gate past the aperture thereof toward said take-up spindle, a source for directing light upon the film, a strip of unperforated heat resisting material constructed to preclude engagement between the same and the teeth of said member and of a length to reach from said take-up spindle past the aperture of said gate and arranged with one end attached to the end of said film other than that which is attached to said delivery spindle and the opposite end attached to said take-up spindle whereby, prior to the initiation of a film feeding operation, said strip of heat resisting material is positioned at the aperture of said gate for the purpose of protecting the film from injury from the heat of said light source, a motor for driving said feeding means and said take-up spindle, and control mechanism interlocking said feeding means and said take-up spindle, said mechanism and said feeding means and said take-up spindle being so constructed and arranged that the power of said motor is applied first to said take-up means and thereafter to said feeding means whereby at the initiation of a film feeding operation by such movement of said take-up spindle the perforated film is brought into operative position relative to the teeth of said feeding member before the operation thereof has begun for the purpose of preventing injury to such perforations, and thereafter, by the operation of said member the film is fed by engagement between the teeth of said member and the perforations of the film and taken up by the continued revolution of said take-up spindle.

15. Material feeding apparatus, comprising means effective for coiling an unperforated strip of material thereupon, a toothed member for feeding a perforated strip of material by positive engagement between the teeth thereof and the perforations of the strip toward said means, an unperforated strip of material arranged with one end attached to said first mentioned means and the other end attached to such perforated strip and an intermediate portion in contact with said member, and control mechanism interconnecting said member and said means and timing means which is necessarily effective for operating said means prior to the operation of said member whereby the feeding operation of the strips is initiated by the coiling of the unperforated strip about said means and carried out by the coiling of both of the strip about said means and the positive feeding of the perforated strip by engagement between the perforations of the same and teeth of the member.

16. Film feeding apparatus comprising a take-up spindle, means for driving said spindle, a length of protective material arranged with one end attached to said take-up spindle and the other end attached to one end of a perforated film, a toothed member adapted by positive engagement between the teeth thereof and the perforations of the film for feeding the same, means for driving said member, a motor, and control mechanism interconnecting both of said driving means and including timing means which is necessarily effective for applying the power of said motor to the driving means for said take-up spindle before the power of said motor is applied to the driving means for said feeding member whereby the operation of said spindle coils said protective material thereupon and draws the perforated film into operative position relative to said toothed member before the initiation of operation of said toothed member.

17. Film feeding apparatus comprising a take-up spindle, means for driving said spindle, a length of protective material arranged with one end attached to said take-up spindle and the other end attached to one end of a perforated film, a toothed member adapted by positive engagement between the teeth thereof and the perforations of the film for feeding the same, means for driving said member, a motor, and control mechanism interconnecting both of said driving means and including a timing device which is necessarily effective first for applying the power of said motor to said take-up spindle before the power of said motor is applied to said feeding member whereby the operation of said spindle coils said material thereupon and draws the perforated film into operative position relative to said toothed member before the initiation of operation of said toothed member and thereafter for applying the power of said motor to said driving means for said feeding member whereby the teeth of said member engage the perforations of said film for feeding the same and said take-up spindle continues to coil said strip upon itself and coils the film upon itself.

18. In a film handling apparatus, mechanism constructed for feeding film by coiling the film about itself, mechanism constructed for feeding the film by positive engagement between a toothed member and perforations in the film, a film constructed with a first portion adapted for cooperation with said first mechanism only and a second portion adapted for cooperation with both of said mechanisms, such film being positioned in said apparatus with said first section in operative relation with said first mentioned mechanism and extending therefrom to a point beyond said toothed member and control means interconnecting both of said mechanisms and including a timing device which is necessarily effective for first initiating the operation of said first mentioned mechanism and thereafter initiating the operation of said second mentioned mechanism.

19. In a film handling apparatus, a delivery spindle, a power driven take-up spindle, a revoluble toothed sprocket positioned therebetween and adapted for moving film from said delivery spindle toward said take-up spindle, a film extending from said delivery spindle to said take-up spindle and in contact with the teeth of said sprocket, the portion of said film adjacent said delivery spindle being constructed and arranged to provide positive engagement between said portion and such teeth so that said film may be driven thereby when said sprocket is revolved and the portion of said film adjacent said take-up spindle being characterized by a width less than the axial distance between the teeth of said member that said portion may be wound upon said take-up spindle without contact between said film and the teeth of said sprocket, and control mechanism interconnecting said spindle and said sprocket and including a timing device which is necessarily effective to initiate the operation of said spindle before the revolution of said sprocket is initiated.

20. Film handling apparatus comprising two spindles, an apertured gate positioned therebetween, a source which directs light upon the aperture of said gate, means for moving a film from one of said spindles to the other, means for moving a film from the second mentioned of said spindles to the first mentioned thereof, and means for preventing damage to the film from the heat of said light source at the conclusion of each of such cycles of movement, said means effective at the conclusion of one of such cycles comprising a strip of heat resisting material, said strip being arranged with one end thereof attached to one of said spindles and the opposite end thereof attached to one end of the film, and said strip being of a length at least as great as the distance between said spindle to which it is attached and the aperture of said gate whereby at the conclusion of one of said cycles said material is positioned at such aperture, and said means effective at the conclusion of the other of said cycles including a heat shield, means whereby said shield is moved from a position outside of the path of light from said source to such aperture and into a position within such path intercepting such light, and control means interlocking said means for moving the film from the other of said spindles and said heat shield, said control means, said heat shield and said last above mentioned moving means being so constructed and arranged that prior to the conclusion of such second mentioned cycle said heat shield is necessarily positioned in such light intercepting position.

21. Film handling mechanism comprising a delivery spindle, means to feed a film therefrom to project the same, a take up spindle upon which the film so fed is coiled, a strip of heat resisting material, one end of said strip being attached to one end of the film, the other end of such strip being attached to said delivery spindle, a source which directs light upon a section of the film intermediate said spindles, a heat shield movable into position between said light source and the film, driving mechanism, means for applying the power of said mechanism to said feeding means for moving the film away from said delivery spindle, means for applying the power of said mechanism to said delivery spindle whereby said spindle is revolved in a rewinding direction and the film coiled thereupon, and a single control means interconnecting said two applying means and said heat shield for the purpose of moving said heat shield in relation to such position between the light source and the film in predetermined relation to such feeding and rewinding operations and the positioning of said strip in the path of the light from said source.

22. Film handling mechanism comprising a delivery spindle and a take up spindle between which a film extends, one end of the film being attached to one of said spindles and the other end thereof being attached to the other of said spindles, a source for passing light through the film at a point between said spindles, means for moving the film from said delivery spindle to said take up spindle in a feeding direction, means for moving the film from said take up spindle to said delivery spindle in a rewinding direction, and means for protecting the film at the conclusion of such rewinding operation, said protecting means including a length of material adapted to resist the heat of said light source, one end of said material being attached to said take up spindle and the other end being attached to the end of the film other than the one which is attached to said delivery spindle, said material being of a length at least as great as the distance between said take up spindle and the point at which the light passes through the film, whereby at the conclusion of said rewinding operation said heat resisting material comes to rest in the path of light from said source, said protecting means further including a yielding device for driving said delivery spindle during such rewinding operation, whereby the end of said length of material attached to said take up spindle is not torn therefrom and the fastening of said length of material to the film is not broken at the conclusion of such rewinding operation.

23. In a film handling apparatus having a source of light, an aperture, a delivery carrier, and a take up carrier, in combination, a film having film feeding perforations along a side edge, the main portion of said film being made of a material adversely affected by heat, an intermittent film feeding member having teeth for cooperation with said perforations, the trailing end portion of said film associated with said delivery carrier being constructed of heat resisting material and the leading end portion of said film associated with said take up carrier being constructed of heat resisting material, said heat resisting portions each being characterized by a reduction in width relative to said main film portion on the side next to said feeding member and to such an extent that said film may be wound upon said take up carrier or upon said delivery carrier without operative engagement being made between said film portions of reduced width and the teeth of said feeding member, a control mechanism interconnecting said take up carrier and said feeding member and including a timing device which is necessarily effective to initiate the operation of said take up carrier before the operation of said feeding member is initiated.

24. In a motion picture apparatus, a main frame, two spindles disposed upon one side thereof and carried thereby for supporting a film, means supported by said frame to feed said film from one of said spindles toward the other, means for rewinding said film from said last mentioned spindle to said first mentioned spindle, spur shafts disposed upon the side of said frame opposite to that upon which said spindles are disposed and substantially parallel with said spindles, means for driving one of said spur shafts from a source of power, means drivingly connecting said spur shafts whereby one of said spur shafts is driven by the other, said drivingly connecting means including a yielding element, and means to connect successively each of said spur shafts with its appropriate spindle.

25. A motion picture apparatus comprising a main frame upon one side of which are supported in spaced parallelism a spindle from which a film may be fed and upon which the film may be rewound thereafter and a spindle upon which the film may be wound after said feeding operation and from which the film may be unrolled thereafter during said rewinding operation, and upon the opposite side of which frame are disposed a spur shaft substantially parallel with said first mentioned spindle, a clutch adapted to connect said shaft and said spindle at will, a spur shaft substantially parallel with said second mentioned spindle, yielding means connecting said second mentioned spur shaft and said first mentioned spur shaft whereby said second mentioned spur shaft drives said first mentioned spur shaft, and means whereby said second mentioned spur shaft is driven by a source of power.

26. Film feeding apparatus comprising an intermittent feeding member and a revoluble film-supporting member between which a film is fed, means positioned therebetween and effective during the operation of said members for controlling the tension upon the film being fed between said members, and mechanism for bringing said tension controlling means into operative relation with said film, said tension controlling means including a resilient pad over which said film passes, a support for said pad, a spring cushioning the operation of said support, and connecting means between said support and said mechanism.

27. Film feeding apparatus comprising an intermittent feeding member and a film-supporting spindle between which a film is fed, means positioned therebetween for controlling the rate of rotation of said film-supporting spindle while a film is being fed between said feeding member and said film-supporting spindle, and mechanism for bringing said rotation controlling means into operative relation to said film, said rotation controlling means comprising a resilient pad over which film passes, a support for said pad, a braking shoe adapted to cooperate with said spindle, connecting means between said shoe and said support, and connecting means between said support and said mechanism, said support being mounted upon said apparatus.

28. In a film handling apparatus, a revoluble film-supporting member and a revoluble film-feeding member between which a film extends, and means for controlling the tension of the portion of the film between said members, said means including a supporting arm pivotally mounted in respect to said apparatus, a flat spring mounted adjacent an end of said arm relatively remote from such mounting and engaging the film between said members and providing a flat film-contacting surface over which the film passes, and resilient means urging said arm toward the film.

29. Film feeding mechanism which comprises a carrier, an apertured gate, a toothed member for feeding a perforated film therethrough by engagement between a tooth of said member and perforations upon one side edge of the film, said member being disposed on the side of the aperture of said gate opposite that upon which said carrier is disposed, a source for directing light upon said aperture, and a tape of heat resisting material, said tape being arranged with one end thereof secured to one end of the film and the opposite end thereof to said carrier, said tape being constructed of a width less than the distance between said perforations and the side edge of the film other than that adjacent which said perforations are arranged and being so secured to the film that it is disposed to one side of the line of said perforations whereby driving engagement between said member and said tape is precluded and said tape being of a length at least as great as the distance between said member and said carrier, whereby, when the film and said tape come to rest in said mechanism through such precluding of such driving engagement, said material is situate opposite the aperture of said gate.

30. In combination, film feeding apparatus and protective mechanism for a film fed thereby; said apparatus comprising a delivery spindle, an apertured gate, a take-up spindle, a toothed member adapted to engage the perforations of a film for feeding the same from said delivery spindle through said gate past the aperture thereof toward said take-up spindle, a source for directing light upon the aperture of said gate, and means for rewinding the film from said take-up to said delivery spindle; said protective mechanism comprising a tape composed of heat resisting material, means operable for protecting the film at the aperture of said gate from the heat of said light source, and control means for operating said protecting means; said tape being arranged with one end attached to said delivery spindle and the opposite end thereof attached to one end of the film whereby at the conclusion of such feeding operation said strip comes to rest opposite said aperture and adjacent said toothed member and said tape being so constructed that driving engagement between the same and said toothed member is precluded, whereby at the conclusion of such feeding operation the film is not torn loose from said delivery carrier, and said control means being adapted for rendering said protecting means operative at the conclusion of said rewinding cycle so that the film is then protected from the heat from said light source.

BARTON ALLEN PROCTOR.